United States Patent
Okutani et al.

(10) Patent No.: US 7,576,786 B2
(45) Date of Patent: Aug. 18, 2009

(54) INFORMATION PROCESSING APPARATUS AND METHOD, PROGRAM THEREFOR AND STORAGE MEDIUM

(75) Inventors: Yasuo Okutani, Kawasaki (JP); Yasuhiro Komori, Kawasaki (JP)

(73) Assignee: Canon Kabushiki Kaisha, Tokyo (JP)

( * ) Notice: Subject to any disclaimer, the term of this patent is extended or adjusted under 35 U.S.C. 154(b) by 615 days.

(21) Appl. No.: 11/050,745

(22) Filed: Feb. 7, 2005

(65) Prior Publication Data
US 2005/0191036 A1 Sep. 1, 2005

(30) Foreign Application Priority Data
Feb. 16, 2004 (JP) .............. 2004-038258

(51) Int. Cl.
*H04N 5/76* (2006.01)
(52) U.S. Cl. .............. 348/231.4; 348/231.3; 348/231.2
(58) Field of Classification Search .............. 348/231.2, 348/231.3, 231.4, 231.5
See application file for complete search history.

(56) References Cited

U.S. PATENT DOCUMENTS

| | | | | |
|---|---|---|---|---|
| 5,796,428 A | * | 8/1998 | Matsumoto et al. | .... 348/207.99 |
| 5,864,868 A | * | 1/1999 | Contois | ............ 707/104.1 |
| 6,774,939 B1 | * | 8/2004 | Peng | .............. 348/231.4 |
| 7,194,701 B2 | * | 3/2007 | Stavely et al. | .............. 715/838 |
| 2004/0037540 A1 | * | 2/2004 | Frohlich et al. | .............. 386/96 |

FOREIGN PATENT DOCUMENTS

| | | |
|---|---|---|
| JP | 01-012778 | 1/1989 |
| JP | 06-251079 | 9/1994 |
| JP | 11-177928 | 7/1999 |

* cited by examiner

*Primary Examiner*—David L Ometz
*Assistant Examiner*—Peter Chon
(74) *Attorney, Agent, or Firm*—Fitzpatrick, Cella, Harper & Scinto

(57) ABSTRACT

In cases where at least one item of sound information has been associated with at least image, at least one desired item of sound information is selected and the sound information is played back in a prescribed order. According, in an information processing apparatus, a playback sequence decision unit (103) reads in image data as well as sound data, which has been assigned within the image data, from a image/sound data storage unit (107), generates a still image in which the positions at which sound data has been recorded is denoted on the image, and displays the generated still image on a image display unit (106). A sound data specifying unit (102) searches the image/sound data storage unit (107) for sound data that has been associated with the interior of an image area specified by an input from a user. When applicable sound data is found to exist, the playback sequence decision unit (103) decides the order in which the applicable sound data is to be played back. A playback processor (104) generates sound data in accordance with the order decided by the playback sequence decision unit (103).

4 Claims, 6 Drawing Sheets

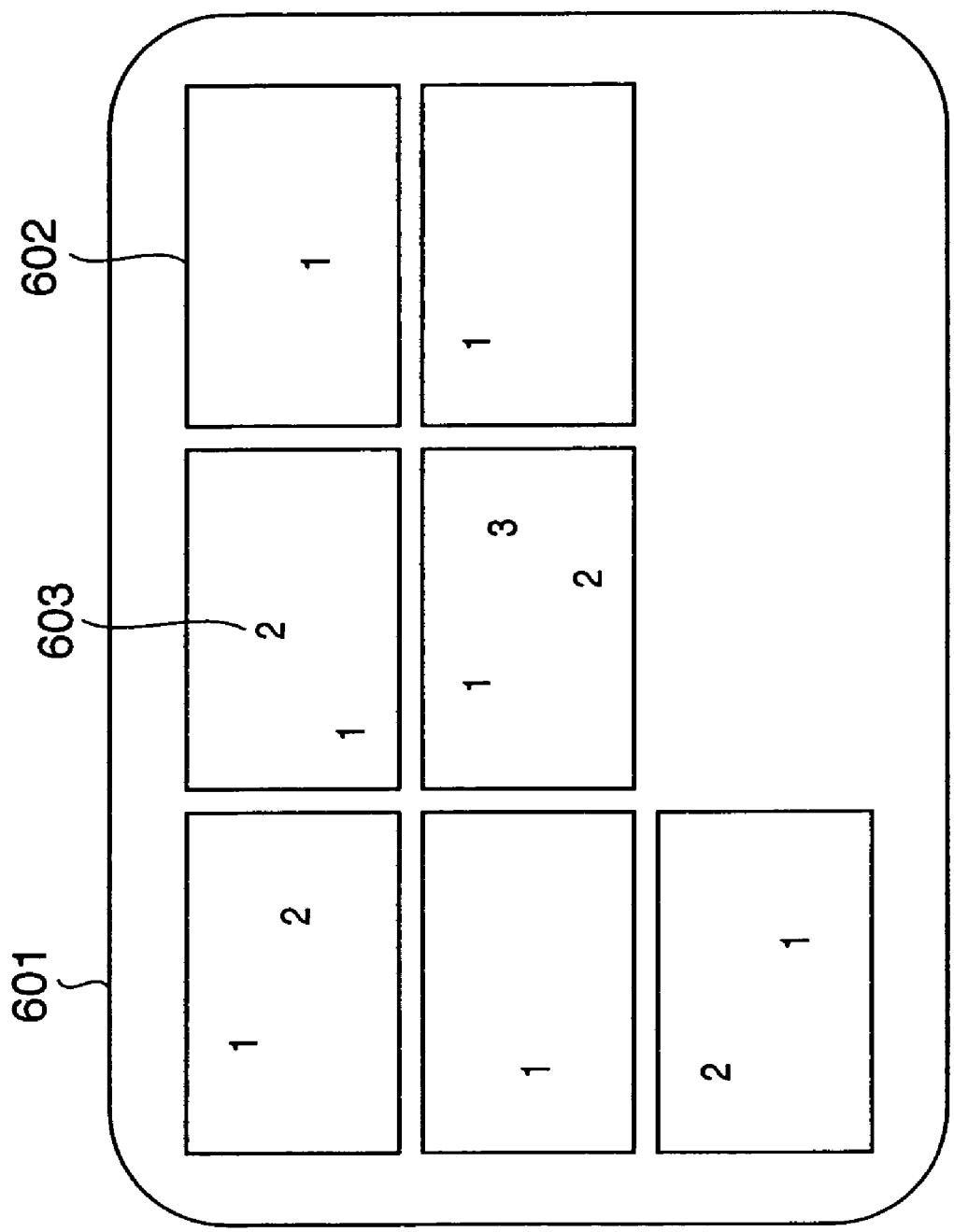

INFORMATION PROCESSING APPARATUS AND METHOD, PROGRAM THEREFOR AND STORAGE MEDIUM

FIELD OF THE INVENTION

This invention relates to an information processing apparatus and method, a program for implementing the method and a storage medium storing the program. More particularly, the invention relates to an information processing apparatus and method for playing back sound information associated with an image, a program therefor and a storage medium storing the program.

BACKGROUND OF THE INVENTION

A known method of playing back images and sound information associated with the images is disclosed by way of example in the specification of Japanese Patent Application Laid-Open No. 11-177928 (Patent Reference 1). According to the method disclosed, if sound information has been assigned to any area within a single still image, the sound information is played back by selecting the assigned area of the sound information being displayed together with the still image. Other known methods of playing back images and sound information associated with the images are to assign the sound information to a single still image [e.g., the specification of Japanese Patent Application Laid-Open No. 01-012778 (Patent Reference 2) and the specification of Japanese Patent Application Laid-Open No. 06-251079 (Patent Reference 3)], and present an indication of whether or not sound information exists by way of superimposition in a state in which a plurality of still images are displayed in list form (e.g., see Patent Reference 2) or present an indication of whether or not sound information exists by drawing a rectangular area around a still image for which sound information exists in a state in which a plurality of still images are displayed in list form (e.g., see Patent Reference 3).

With the method of Patent Reference 1, however, multiple items of desired sound information are not produced in a case where these multiple items of sound information have been recorded for a single still image.

Further, with the methods of Patent. References 2 and 3, even still images for which sound information does not exist are displayed in the form of a list. Such an arrangement is not suitable for viewing on the small display devices with which digital cameras and the like are equipped.

SUMMARY OF THE INVENTION

The present invention has been proposed to solve the problems of the prior art and its object is to provide an information processing apparatus, method, program and storage medium whereby it is possible to select at least one desired item of sound information in a case where at least one item of sound information has been associated with at least one image and to play back selected items of sound information in an appropriate order.

According to the present invention, the foregoing object is attained by providing an information processing apparatus for playing back sound information that has been associated with an image, comprising: display means for displaying at least one image with which at least one item of sound information has been associated; selecting means for selecting at least one image from at least one image that has been displayed; and playing back means for playing back at least one item of sound information, which has been associated with at least one image selected, in a prescribed order.

In accordance with the present invention, at least one image is selected from at least one image displayed, and sound information that has been associated with at least one image selected is played back in a prescribed order. As a result, by selecting at least one desired item of sound information in a case where at least one item of sound information has been associated with at least one image, selected items of sound information can be played back in an appropriate order.

Further, the selecting means in the information processing apparatus according to the present invention has specifying means for specifying, from at least one item of sound information to be played back, sound information that conforms to input information.

In accordance with the present invention, sound information that conforms to input information is specified from at least one item of sound information. This makes it possible to facilitate the selection of sound information.

Furthermore, the selecting means in the information processing apparatus according to the present invention has specifying means for specifying, one at a time, at least one item of sound information to be played back.

In accordance with the present invention, at least one item of sound information is specified one at a time. As a result, an order in case of specifying the sound information can be also used as one of choices in case of deciding the playback sequence.

Furthermore, the display means in the information processing apparatus according to the present invention displays in list form only images with which at least one item of sound information has been associated.

In accordance with the present invention, only an image with which sound information has been associated is displayed in a list. Even if the display device is of small size, therefore, viewability is assured and the selection of sound information can be facilitated.

Furthermore, when the sound information has been associated with the image, the display means in the information processing apparatus according to the present invention displays a mark indicating that the sound information has been associated with this image.

In accordance with the present invention, when sound information has been associated with an area of an image, a mark indicating that the sound information has been associated with the area is displayed at the area. As a result, an image for which sound information exists can be found reliably and easily.

Furthermore, the display means in the information processing apparatus according to the present invention displays, in highlighted form, an image with which sound information being played back by the playing back means has been associated.

In accordance with the present invention, an image with which there is associated sound information that is being played back is displayed in highlighted form. As a result, sound information being played back can be found reliably and easily.

Furthermore, in the information processing apparatus according to the present invention, at least one image is a moving image.

Further, according to the present invention, the foregoing object is attained by providing an information processing method for playing back sound information that has been associated with an image, comprising: a display step of displaying at least one image with which at least one item of sound information has been associated; a selecting step of selecting at least one image from at least one image that has been displayed; and a playing back step of playing back at least one item of sound information, which has been associated with at least one image selected, in a prescribed order.

Further, according to the present invention, the foregoing object is attained by providing an information processing program for playing back sound information that has been associated with an image, comprising: a display module for displaying at least one image with which at least one item of sound information has been associated; a selecting module for selecting at least one image from at least one image that has been displayed; and a playing back module for playing back at least one item of sound information, which has been associated with at least one image selected, in a prescribed order.

Further, according to the present invention, the foregoing object is attained by providing an information processing storage medium that stores the program described above.

Other features and advantages of the present invention will be apparent from the following description taken in conjunction with the accompanying drawings, in which like reference characters designate the same or similar parts throughout the figures thereof.

BRIEF DESCRIPTION OF THE DRAWINGS

The accompanying drawings, which are incorporated in and constitute a part of the specification, illustrate embodiments of the invention and, together with the description, serve to explain the principles of the invention.

FIG. 6 is a diagram useful in describing plural images displayed as a screen image on the image display unit shown in FIG. 1.

DETAILED DESCRIPTION OF THE PREFERRED EMBODIMENTS

Figure 1:
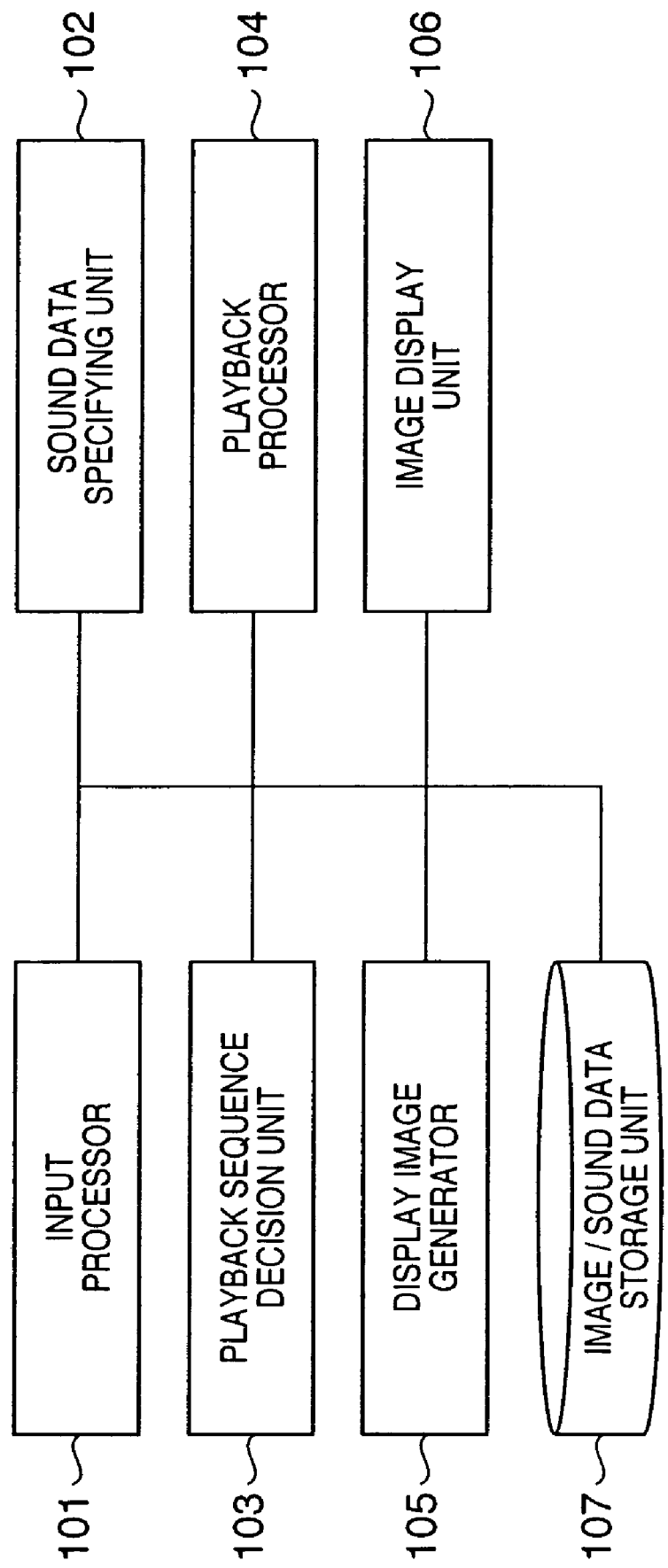
FIG. 1 is a block diagram schematically illustrating the structure of an information processing apparatus according to a first embodiment of the present invention.

FIG. 1 is a block diagram schematically illustrating the structure of an information processing apparatus according to a first embodiment of the present invention.

The information processing apparatus of FIG. 1 includes an input processor 101, a sound data specifying unit 102, a playback sequence decision unit 103, a playback processor 104, a display image generator 105, an image display unit 106 and an image/sound data storage unit 107.

The input processor 101 processes information that a user inputs via an input unit such as a touch-sensitive panel. The sound data specifying unit 102 searches for sound data, which has been assigned to areas designated by the user, in the image/sound data storage unit 107 and specifies all applicable sound data. The playback sequence decision unit 103 decides a sequence in which results of search and retrieval by the sound data specifying unit 102 are presented to the user. The playback processor 104 plays back the sound data. The display image generator 105 generates an image that is the result of denoting positions, to which sound data has been assigned, on the image that has been stored in the image/sound data storage unit 107. The image display unit 106 displays the image. The image/sound data storage unit 107 stores the image and data that includes one or more items of sound data that have been assigned to any areas of the image.

In the information processing apparatus of FIG. 1, a plurality of items of sound data have been assigned to given respective image areas on a single still image. These multiple items of sound data include information relating to the order in which they were recorded or the times at which they were recorded.

Figure 2:
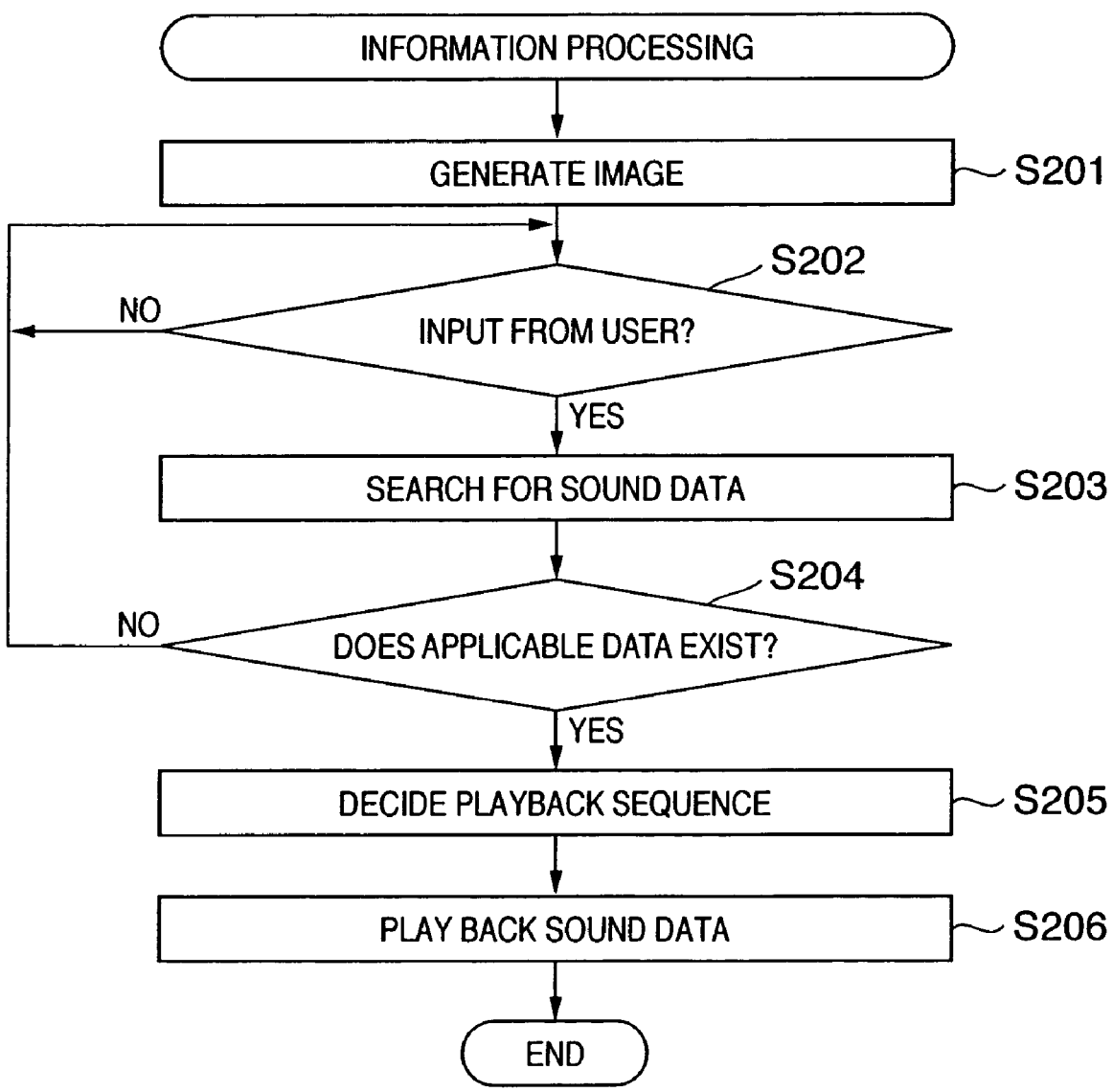
FIG. 2 is a flowchart of information processing executed by the information processing apparatus shown in FIG. 1.

FIG. 2 is a flowchart of information processing executed by the information processing apparatus of FIG. 1.

The processing of FIG. 2 will be described with reference to FIG. 3 when appropriate.

In FIG. 2, first the display image generator 105 reads in image data, as well as sound data that has been assigned in this image data, from the image/sound data storage unit 107, generates a screen image in which the positions of the sound data are denoted on the image, and displays the generated screen image (indicated at 300 in FIG. 3) on the screen (301 in FIG. 3) of the image display unit 106 (step S201).

Next, the input processor 101 determines whether there is an input from the user (step S202). In this embodiment, an input from the user is applied via a touch-sensitive panel or the like, and the applied input information is a closed curve (305 in FIG. 3) that encloses a specific area on the screen image presented on the image display unit 106. The closed curve need not necessarily define a closed curve at input. If the curve is not closed, it will suffice to render it closed as by interpolation processing. A certain specific area is designated by this input from the user.

If the result of the determination at step S202 is that the user has made an input, then the sound data specifying unit 102 searches the image/sound data storage unit 107 for any sound data associated with the specified part (305 in FIG. 3) in the image (step S203). Next, it is determined from the result of the search whether applicable sound data exists (step S204). When there is no applicable sound data, processing from step S202 onward is repeated. On the other hand, when applicable sound data exists (310, 311 in FIG. 3), the playback sequence decision unit 103 decides the playback sequence of the applicable sound data (302, 303 in FIG. 3) (step S205). Assume that the playback sequence in a case where the applicable sound data is plural in number is the order in which the sound data was recorded. Since the order in which the sound data was recorded or the times at which the sound data was recorded will have been stored in the image/sound data storage unit 107, these can readily be determined. Next, the playback processor 104 plays back the sound data in the order decided by the playback sequence decision unit 103 (step S206). Processing is then exited.

Following the end of processing (step S206), control returns to step S202. For example, in a case where it is attempted to repeat playback of a desired sound with regard to the same image, it is no longer necessary for the user to select the image. This results in enhanced usability.

Figure 3:
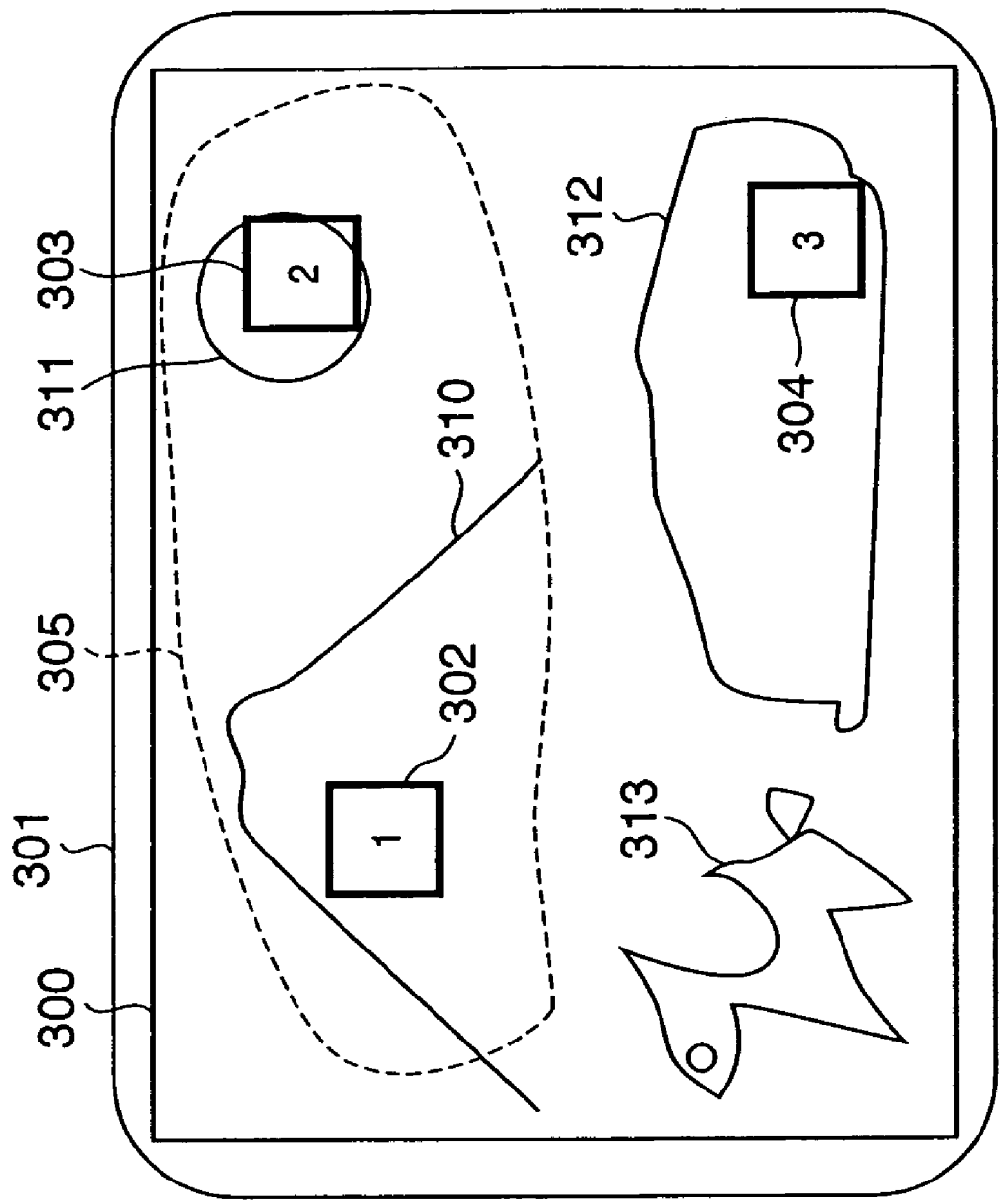
FIG. 3 is a diagram useful in describing a screen image on an image display unit shown in FIG. 1.

FIG. 3 is a diagram useful in describing the screen displayed on the image display unit in FIG. 1.

In FIG. 3, the screen 301 displays the still image 300, which has been captured as by a digital camera. A mountain 310, the sun 311, a lake 312 and an animal 313 appear in the image. Marks 302, 304, 303 are displayed on the still image 300 at position coordinates with which the sound data has been associated. The numerals within the marks 302, 304, 303 indicate the order in which the respective ones of the items of sound data have been recorded.

Furthermore, the closed curve in the still image 300 indicates the area 305 specified by the user input. Since the sound data at mark 302 in this area was recorded earlier than the sound data at mark 303, the playback sequence is the sound data at mark 302 followed by the sound data at mark 303.

In the first embodiment described above, the case described is one in which the input by the user is the closed curve (305 in FIG. 3) and one or more items of sound data (302, 303 in FIG. 3) exist within the area bounded by the closed curve. However, this does not impose a limitation upon the invention and a case where one or more items of sound data are designated by pointing may be adopted as a modification of the first embodiment. The term "pointing" mentioned here means specifying a specific location by a pen or the like on a touch-sensitive panel or clicking a specific position using a mouse. For example, one item of sound data designated by pointing is played back in the method described in Patent Reference 1. Thus, pointing can designate only one certain specific location. However, by successively playing back a plurality of items of sound data, which have been selected by a plurality of pointing operations, in the order in which they were pointed out, it is possible to select a plurality of items of sound data.

On the other hand, there are cases where it is desired to play back a separate item of sound data during the playback of a certain item of sound data, e.g., cases where the leading end portion of each item of data among many items of recorded sound data is played back to thereby check the nature of this sound data. Ordinarily, in order to meet these demands, often a general user interface is employed to select the separate item of sound data during playback of a certain item of sound data. When the separate item of sound data has been selected, the sound data that is currently being played back is stopped from being played back and playback of the selected sound data is started. In such case the method of simply playing back, in the order of selection, a plurality of items of sound data selected by a plurality of pointing operations and a method of instantly playing back an item of sound data by a pointing operation run counter to each other.

In such case the following method is effective: First, a threshold value is set beforehand as a pointing interval. An instance where pointing has been repeated successively at intervals shorter than the threshold value is construed to mean the selection of a plurality of items of sound data. In the converse case, sound data currently being played back is stopped being played back and playback of sound data that has been pointed out is started.

By thus setting a threshold value, it is possible for the two input methods to be made to exist together.

Furthermore, a selection method such as using a button or the like to allow the user to select either of the two methods may be provided.

Furthermore, besides playing back sound data in the sequence in which the sound data was selected by a plurality of pointing operations, it is also permissible to play back sound data in the order in which a plurality of selected items of sound data where recorded.

Figure 4:
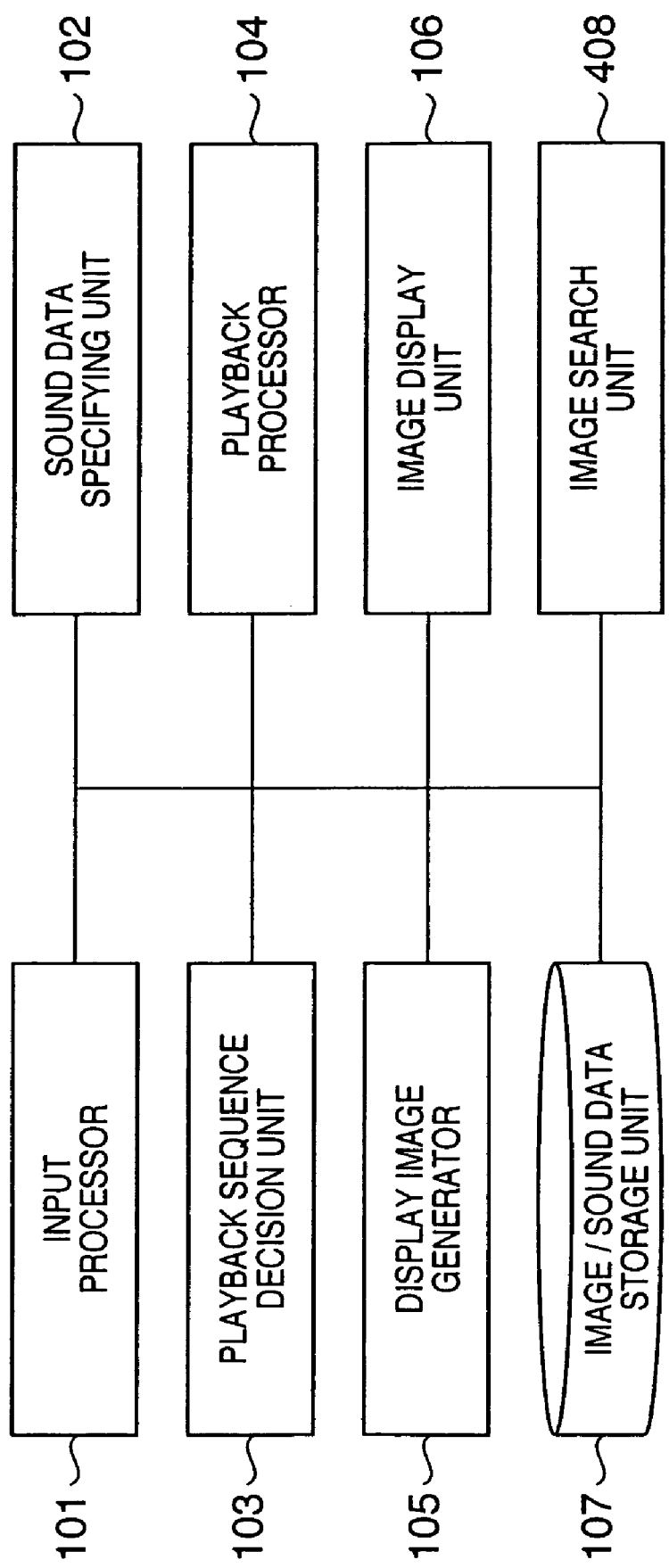
FIG. 4 is a block diagram schematically illustrating the structure of an information processing apparatus according to a second embodiment of the present invention.

FIG. 4 is a block diagram schematically illustrating the structure of an information processing apparatus according to a second embodiment of the present invention.

In the first embodiment of the invention and the modification thereof, a case where a plurality of items of sound data have been associated with a single image is described. In the second embodiment, however, a case where there are a plurality of images and a plurality of items of sound data will be described.

By way of example, consider a case where an information processing apparatus has a small display device, as is the case with a digital camera or the like. In an instance where sound data that has been recorded in association with images is played back, it is convenient if the images are displayed in the form of a list, as in the examples of Patent References 2 and 3. However, if the display device is small, which is the case with a digital camera or the like, the number of images that can be displayed in the list is small. In order to search for all images for which sound data exists, it is necessary to divide up the list into smaller lists a number of times and display each one. This is inconvenient. Accordingly, consider a case where only images having associated sound data are displayed.

The information processing apparatus of FIG. 4 has a structure that is basically identical with that of the apparatus shown in FIG. 1. Components identical with those of the apparatus of FIG. 1 are designated by like reference characters and need not be described again. Only aspects different from those of the apparatus of FIG. 1 will be described.

The information processing apparatus shown in FIG. 4 differs from that of FIG. 1 only in that an image search unit 408 is connected to the bus. The image search unit 408 searches the data in the image/sound data storage unit 107 for all image data having one or more items of associated sound data.

Figure 5:
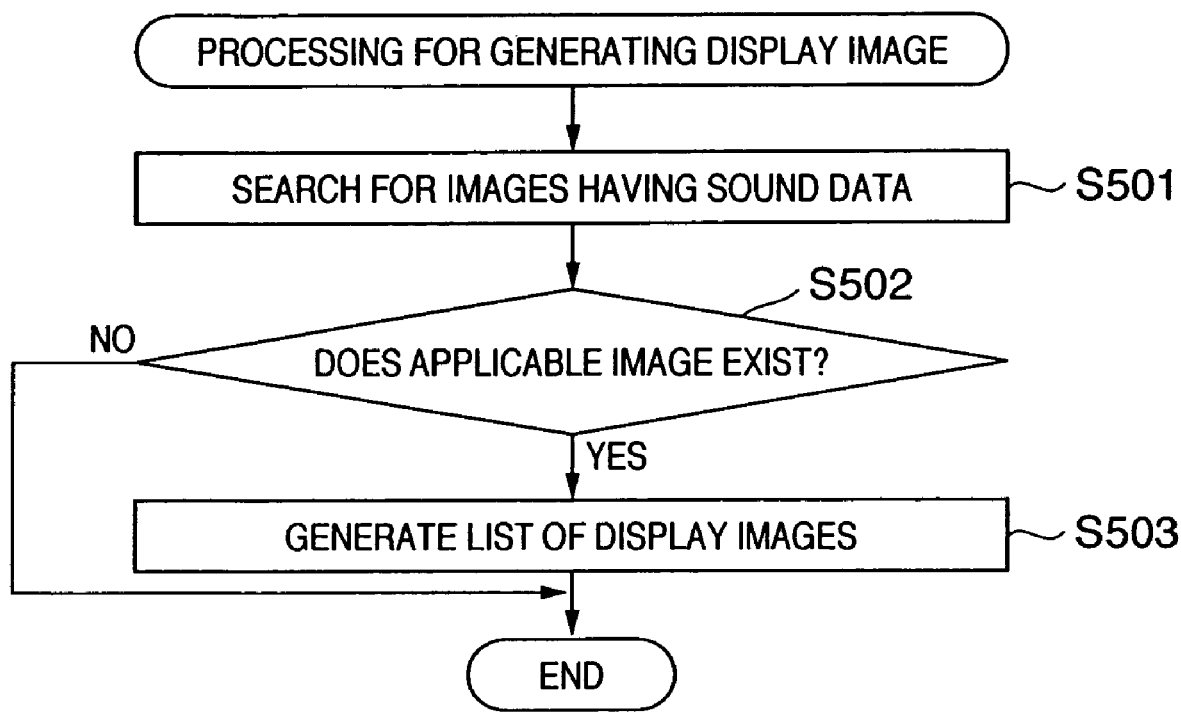
FIG. 5 is a flowchart of processing for generating a screen image at step S201 in FIG. 2.

The information processing apparatus of FIG. 4 executes the information processing of FIG. 2 upon executing the information processing of FIG. 5 as the image generation processing at step S201 in FIG. 2.

The processing of FIG. 5 will be described with reference to FIG. 6 when appropriate.

In FIG. 5, the image search unit 408 searches the image/sound data storage unit 107 for all images with which sound data has been associated (step S501). Next, it is determined from the result of the search whether applicable sound data exists (step S502). When there is no applicable sound data, processing is exited. On the other hand, when applicable sound data exists, images (602 in FIG. 6) for presenting a list display of images retrieved as a result of the search are generated and the generated images are displayed on the image display unit 106 (601 in FIG. 6) (step S503). Processing is then exited. At step S503, the positions at which sound data (603 in FIG. 6) has been associated are displayed on the image display unit 106.

FIG. 6 is a diagram useful in describing another screen displayed on the image display unit in FIG. 1.

The screen 601 displays seven still images 602 in which respective ones of a plurality of items of sound data (marks 603) are associated with specific areas. The numerals encircled by the marks 603 represent the order in which the items of sound data were recorded in each of the images 602. Although the numbers have been reassigned for every image in FIG. 6, this does not impose a limitation upon the invention; consecutive numbers may just as well be assigned to all of the images. Further, the times at which the sound data was recorded in the image/sound data storage unit 107 or the order in which the sound data was recorded throughout all of the images 602 may be appended.

A case where a plurality of items of sound data have been associated with a single image has been described in the above embodiment. However, this does not impose a limitation upon the invention; a single item of sound data may just as well be associated with a single image. In such case the marks 603 indicating the applicable sound data in FIG. 6 will be unnecessary. The image search unit 408 in FIG. 4 would search for images with which sound data has been associated.

In the case described in the embodiment above, the order in which sound data has been recorded is displayed on an image. However, this does not impose a limitation upon the invention and merely the fact that sound data exists at the position may be denoted. Furthermore, there can also be instances where even the fact that sound data exists is not displayed. In addition, it is permissible to provide setting means whereby it is possible to set display or non-display of the order in which sound data has been recorded or display or non-display of the positions at which sound data exists.

In the case described in the embodiment above, a displayed image does not change while a plurality of items of sound data are being played back in succession. However, this does not impose a limitation upon the invention; by highlighting the position of sound data that is currently being played back, which sound data is being played back may be indicated to the user. In this case the playback processor 104 and display image generator 105 would operate simultaneously.

In the case described in the embodiment above, the order in which a plurality of items of sound data are played back is made the order in which the sounds were recorded. However, this does not impose a limitation upon the invention; items of sound data may be played back in an order that was set by the person who recorded them.

In this case, data relating to the order of playback will have been stored in the image/sound data storage unit 107. Further, in relation to the order of playback, it is permissible to provide setting means for allowing the user to set in which order sounds are played back, namely, in an order that has been set by the person who recorded the sounds or in the order in which the sounds were recorded.

In the case described in the embodiment above, playback of a plurality of items of sound data is performed in numerical order. However, this does not impose a limitation upon the invention; a selected plurality of items of sound data may be played back simultaneously. A plurality of items of sound data must be superimposed in order to implement this feature.

In the case described in the embodiment above, sound data has been associated with still images. However, this does not impose a limitation upon the invention; sound data may be associated with the frames of moving images.

In the case described in the modification of the first embodiment above, a plurality of items of sound data are selected by successive pointing operations. However, this does not impose a limitation upon the invention; a plurality of items of sound data may be pointed to simultaneously.

Note that the present invention can be applied to an apparatus comprising a single device or to system constituted by a plurality of devices.

Furthermore, the invention can be implemented by supplying a software program, which implements the functions of the foregoing embodiments, directly or indirectly to a system or apparatus, reading the supplied program code with a computer of the system or apparatus, and then executing the program code. In this case, so long as the system or apparatus has the functions of the program, the mode of implementation need not rely upon a program.

Accordingly, since the functions of the present invention are implemented by computer, the program code installed in the computer also implements the present invention. In other words, the claims of the present invention also cover a computer program for the purpose of implementing the functions of the present invention.

In this case, so long as the system or apparatus has the functions of the program, the program may be executed in any form, such as an object code, a program executed by an interpreter, or scrip data supplied to an operating system.

Example of storage media that can be used for supplying the program are a floppy disk, a hard disk, an optical disk, a magneto-optical disk, a CD-ROM, a CD-R, a CD-RW, a magnetic tape, a non-volatile type memory card, a ROM, and a DVD (DVD-ROM and a DVD-R).

As for the method of supplying the program, a client computer can be connected to a website on the Internet using a browser of the client computer, and the computer program of the present invention or an automatically-installable compressed file of the program can be downloaded to a recording medium such as a hard disk. Further, the program of the present invention can be supplied by dividing the program code constituting the program into a plurality of files and downloading the files from different websites. In other words, a WWW (World Wide Web) server that downloads, to multiple users, the program files that implement the functions of the present invention by computer is also covered by the claims of the present invention.

It is also possible to encrypt and store the program of the present invention on a storage medium such as a CD-ROM, distribute the storage medium to users, allow users who meet certain requirements to download decryption key information from a website via the Internet, and allow these users to decrypt the encrypted program by using the key information, whereby the program is installed in the user computer.

Besides the cases where the aforementioned functions according to the embodiments are implemented by executing the read program by computer, an operating system or the like running on the computer may perform all or a part of the actual processing so that the functions of the foregoing embodiments can be implemented by this processing.

Furthermore, after the program read from the storage medium is written to a function expansion board inserted into the computer or to a memory provided in a function expansion unit connected to the computer, a CPU or the like mounted on the function expansion board or function expansion unit performs all or a part of the actual processing so that the functions of the foregoing embodiments can be implemented by this processing.

The present invention is not limited to the above embodiments and various changes and modification can be made within the spirit and scope of the present inventions. Therefore, to apprise the public of the scope of the present inventions, the following claims are made.

CLAIM OF PRIORITY

This patent application claims priority from Japanese Patent Application No. 2004-038258 filed on Feb. 16, 2004, which is hereby incorporated by reference herein.

What is claimed is:

1. An information processing apparatus comprising:
   storing means for storing (a) a plurality of items of sound information and (b) an order condition of the plurality of items of sound information;
   a display control unit which displays images with which the plurality of items of sound information have been associated and which displays, on the images, marks indicating sound information having been associated with the images;
   a selecting unit which selects a plurality of items of playback sound information by designating a plurality of marks simultaneously among the displayed marks on the displayed images;

a decision unit which decides a playback sequence of the plurality of items of playback sound information selected by the selecting unit, in accordance with the order condition stored by the storing means; and a playing back unit which plays back the plurality of items of playback sound information according to the playback sequence decided by the decision unit.

2. The apparatus according to claim 1, wherein the order condition includes one of (a) a time order of recording the sound information, and (b) an order that was set by the person who recorded the sound information.

3. An information processing method comprising:

a storing step of storing (a) a plurality of items of sound information and (b) an order condition of the plurality of items of sound information;

a display control step of displaying images with which the plurality of items of sound information have been associated and which displays, on the images, marks indicating sound information having been associated with the images;

a selecting step of selecting a plurality of items of playback sound information by designating a plurality of marks simultaneously among the displayed marks on the displayed images;

a decision step of deciding a playback sequence of the plurality of items of playback sound information selected by the selecting step, in accordance with the order condition stored by the storing step; and a playing back step of playing back the plurality of items of playback sound information in accordance with the playback sequence decided by the decision step.

4. A computer-readable storage medium storing computer-readable instructions, the computer-readable instructions causing a computer to execute the method of claim 3.

* * * * *